Sept. 18, 1962 W. B. ABBOTT 3,054,500
SECOND ELEVATOR MECHANISM FOR LINECASTING MACHINES
Filed Dec. 12, 1960 4 Sheets-Sheet 1
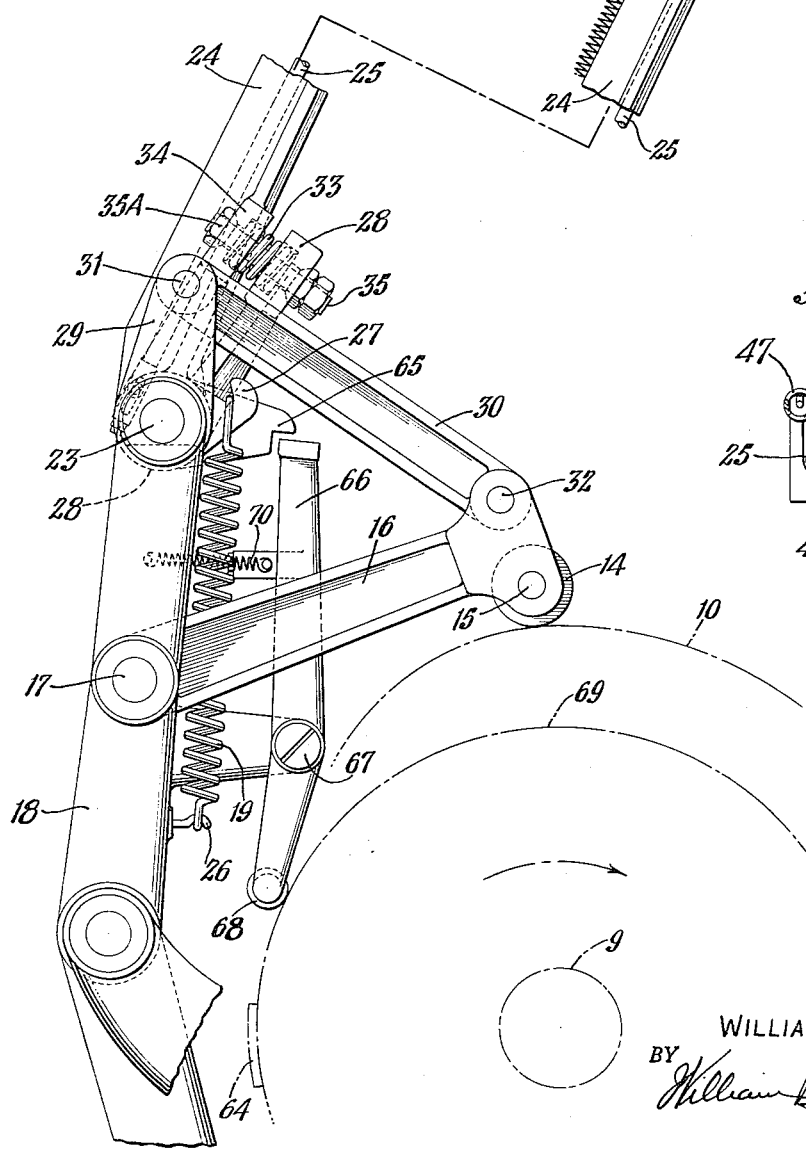
Fig:1.
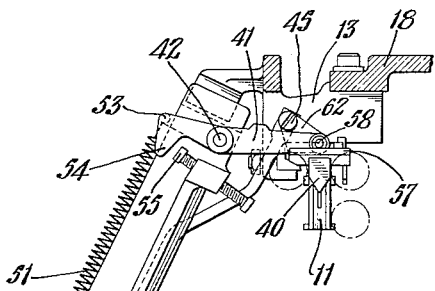
Fig:6.
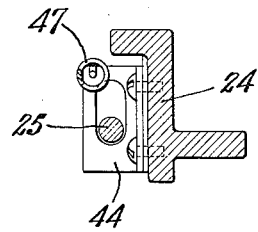
INVENTOR.
WILLIAM B. ABBOTT
BY
ATTORNEY

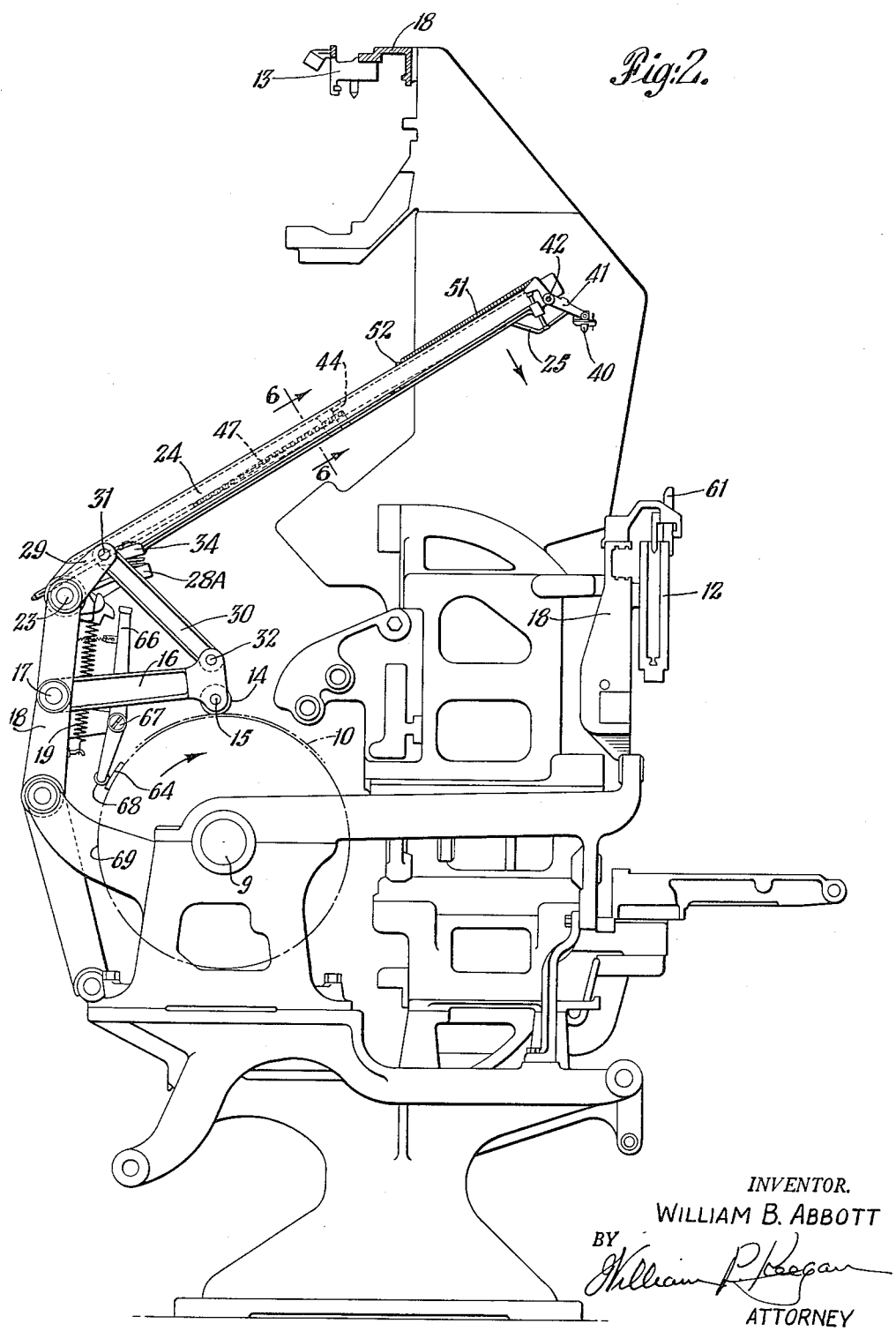

Sept. 18, 1962 W. B. ABBOTT 3,054,500
SECOND ELEVATOR MECHANISM FOR LINECASTING MACHINES
Filed Dec. 12, 1960 4 Sheets-Sheet 3
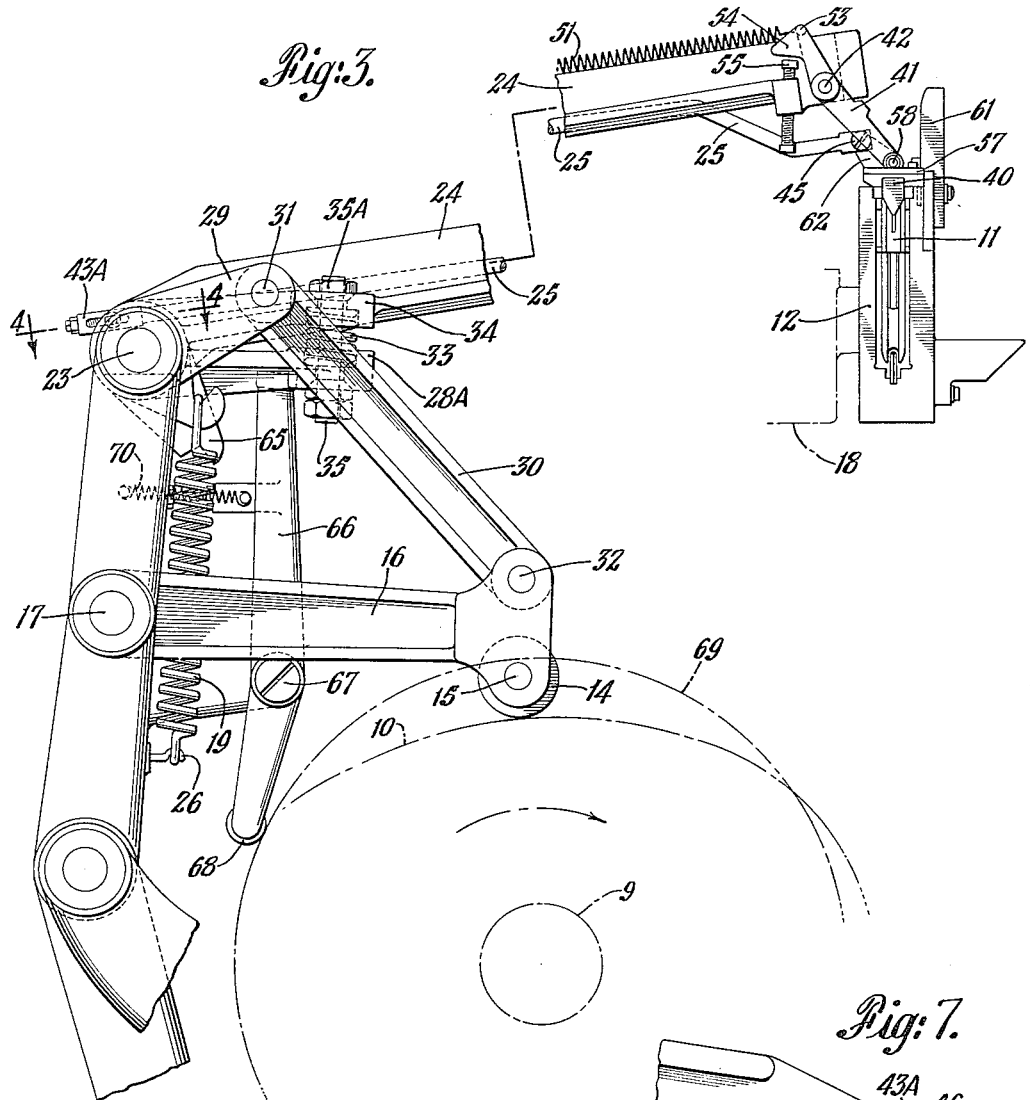
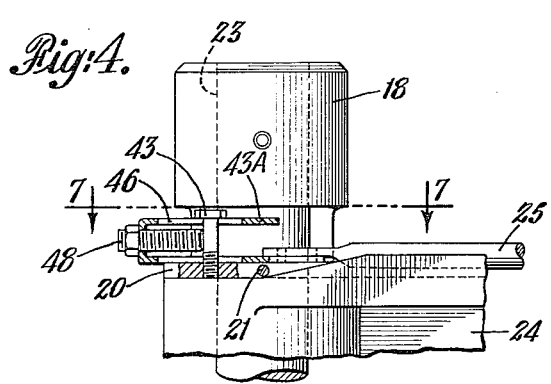
INVENTOR.
WILLIAM B. ABBOTT
BY
ATTORNEY Sept. 18, 1962 W. B. ABBOTT 3,054,500
SECOND ELEVATOR MECHANISM FOR LINECASTING MACHINES
Filed Dec. 12, 1960 4 Sheets-Sheet 4
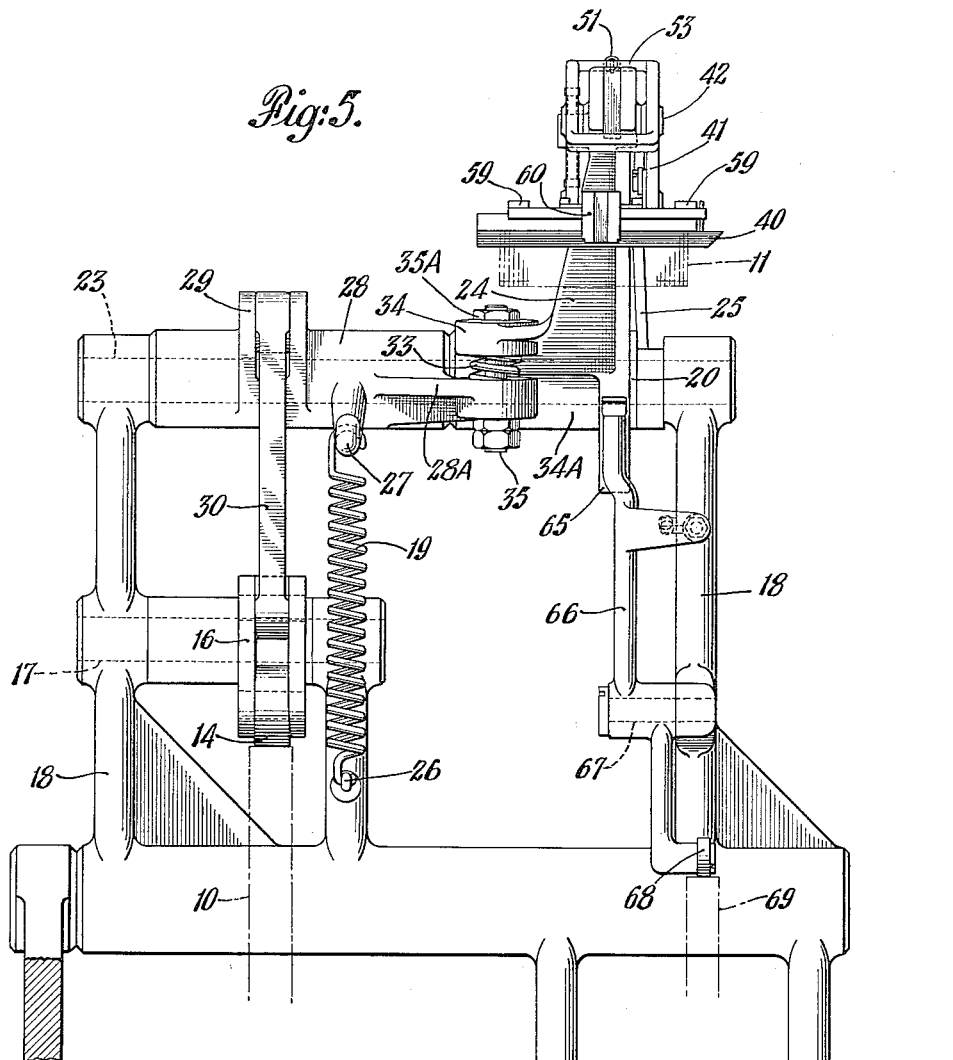
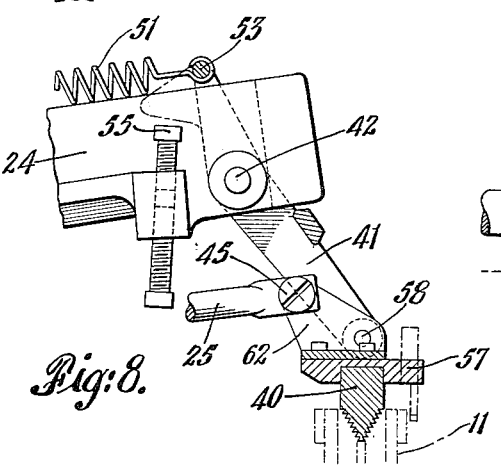
INVENTOR.
WILLIAM B. ABBOTT
ATTORNEY

United States Patent Office 3,054,500
Patented Sept. 18, 1962

3,054,500
SECOND ELEVATOR MECHANISM FOR LINECASTING MACHINES
William Barkley Abbott, Baldwin, N.Y., assignor to Mergenthaler Linotype Company, a corporation of New York
Filed Dec. 12, 1960, Ser. No. 75,282
6 Claims. (Cl. 199—37)

This invention relates to typographical machines such as linecasting machines of the general organization represented in U.S. Letters Patents to O. Mergenthaler, No. 436,532 wherein circulating matrices are released from a magazine in the order in which they are to appear in print and then assembled in line with spacebands, the composed line transferred to the face of a mold, the mold filled with molten metal to form a type bar or slug and the matrices returned through a distributing mechanism to the magazines from which they started while the spacebands are returned to their own separate magazine or box. The machine functions are carried out in proper sequence and in timed relation to one another under the control of a plurality of cams mounted on a main cam shaft which makes one revolution for each machine cycle. At the completion of each cycle of operation all parts have reached their normal position ready for the next cycle. More particularly the present invention relates to an improved parallelogram type second elevator mechanism which facilitates quick smooth transportation of the matrices from the intermediate channel to the distributor mechanism.

Generally speaking, the speed at which the second elevator operates is directly proportional to the speed of operation of the machine itself inasmuch as the cam which controls actuation of the second elevator is mounted on the same cam shaft which controls the speed of other machine functions. However, since the second elevator becomes operative during the last stages of the machine cycle its movement is governed by steep rises on the cam surfaces and therefore it functions at a relatively high rate of speed. This rapid operation has resulted, particularly in the new high speed machines, in violent swinging of the matrices suspended on the second elevator bar as they leave the intermediate channel and are carried toward the distributor mechanism. The continuous swinging of the matrices on the second elevator bar causes excessive wearing of the lower rows of teeth on the bar necessitating frequent replacement thereof and also excessive wear and damage to the teeth of the matrices.

In order to obviate these difficulties the present invention provides an improved second elevator mechanism whereby the matrices are maintained in an upright position when raised from the intermediate transfer channel to the distributor mechanism. Specifically, the single lever mechanism, previously used, has been replaced by a two member mechanism, each member being separately mounted between its own stationary pivot on the machine frame and its own pivot on the movable elevator head. In this manner arcuate ascent or descent of the two members conjointly about their stationary pivots maintains the elevator head and therefore the suspended line of matrices in vertical alignment. Furthermore, one of the two members is slidably mounted on, and spring biased against its stationary pivot to provide yieldable registration and alignment of the elevator bar with the intermediate transfer channel and the distributor mechanism. With this mechanism in operation the undesirable swinging is minimized and the resulting shortcomings heretofore encountered are substantially reduced, resulting in improved machine operation.

Features and advantages of the invention will be gained from the foregoing and from the description of a preferred embodiment thereof which follows.

In the drawings:

FIG. 1 is a side elevational view of the improved second elevator in its uppermost position adjacent the distributor mechanism;

FIG. 2 is a side elevational view of a linecasting machine showing the improved second elevator during descent;

FIG. 3 is a side elevational view of the improved second elevator in its lowermost position within the intermediate channel;

FIG. 4 is a fragmentary view taken on line 4—4 of FIG. 3 looking in the direction of the arrows;

FIG. 5 is a fragmentary front elevational view of the improved second elevator and a portion of the machine frame;

FIG. 6 is a fragmentary view taken on line 6—6 of FIG. 2 looking in the direction of the arrows;

FIG. 7 is an enlarged fragmentary view taken on line 7—7 of FIG. 4 of the slot mechanism located on the rearward end of the elevator rod; and FIG. 8 is an enlarged fragmentary view of the elevator bar and its supporting mechanisms.

The second elevator operating cam 10 is mounted on the main cam shaft 9 as are all other operating cams of a linecasting machine. This shaft makes one revolution for each machine cycle and cam 10 controls the descent of the second elevator to the intermediate channel 12 to receive a line of matrices 11 and the return thereof to its normal position wherein the matrices are fed to the distributor mechanism 13 (FIGS. 1 and 2). The roller 14 is rotatably mounted on a pin 15 secured to lever 16 which is pivotally mounted on shaft 17 of machine frame 18. The roller is constantly biased against cam 10 by the spring 19 as hereinafter described and functions to transmit cam controlled arcuate motion to the second elevator lever 24 and the rod 25. Spring 19 is mounted between the hook 26 projecting from frame 18 and hook 27 formed on the elongated hub 28 (FIG. 5) thereby rotating the hub 28 clockwise. The arm 29 which is formed on hub 28 is, therefore, pivoted clockwise on shaft 23 to urge roller 14 into engagement with cam 10. The downward force is transmitted through the link 30 which extends between arm 29 and lever 16 and is pivotally connected to them by pins 31 and 32, respectively.

Depending on whether the high or low surface of cam 10 is passing thereunder, roller 14 begins upward or downward arcuate movement thereby raising or lowering link 30 and rotating hub 28 accordingly. This rotative motion of hub 28 is reflected in the oscillating movement of arm 28A which through compression spring 33 actuates arm 34 and hub 34A on which it is formed. Lever 24 is also formed on hub 34A and it is consequently pivoted as hub 34A rotates on shaft 23. A bolt 35 and nut 35A limit the separation of arms 28A and 34. Spring 33 also operates in the conventional manner as a cushion to prevent damage to machine parts in the event a jamming should occur between the second elevator and the distributor mechanism. Moreover, it is compressed during the time that the second elevator is in its upper transfer position and holds the second elevator bar 40 steady while the cam 10 continues to rotate and roller 14 rolls on the raised surface thereof.

The lever 24 is a long straight member formed on hub 34A and carrying at its extreme end the yoke 41 which is pivotally mounted on pin 42 (FIGS. 1, 3 and 8). The rod 25 is pivotally mounted on stud 43 (FIGS. 4 and 7) projecting from washer member 20 adjacent one end, guided by member 44 (FIG. 6) at a point intermediate its ends, and pivotally fastened to hereinafter described elevator plate 62 by screw 45 at its remote end. The member 20 is rotatably mounted on shaft 23 and provided with set screw 21 to provide selective positioning of member 20 and stud 43. This adjustment affords accurate alignment of rod 25 in the overall second elevator mechanism. Rod 25 is further pivoted conjointly with lever 24 through operation of the aforementioned member 44 which is mounted on lever 24. The rearward end of rod 25 terminates in a slotted bracket 43A (FIG. 4) which is fitted on stud 43 as shown. Bracket 43A is provided with adjustable screw 48 which further facilitates adjustment of the second elevator mechanism. The spring 47 mounted between bracket 43A and member 44 continuously urges the rearward end of slot 46 toward stud 43 for a reason hereinafter described. It will be noted that shaft 23 and stud 43 both being mounted on the machine frame 18 act as stationary pivot points for lever 24 and rod 25 respectively.

The spring 51 mounted between screw 52 of lever 24 and pin 53 of yoke 41 continuously biases abutment 54 against the adjustable stop 55 mounted on lever 24. This spring provides for yieldable horizontal alignment of the elevator head 57 with the distributor mechanism and vertical alignment with the transfer channel as hereinafter described. Elevator head 57 is pivotally mounted on pin 58 and has elevator bar 40 attached thereto (as shown). Also mounted on the elevator head 57 are two distributor engaging pads 59 and a slide 60 which engages the alignment post 61 of the intermediate channel on descent of the second elevator as hereinafter described. Note that screw 45 is mounted on plate 62 which is fastened to head 57 thereby forming a direct connection between rod 25 and bar 40.

A better understanding of the present invention will be had from the description of an operating cycle which follows. The second elevator begins its cycle from its upper transfer position (FIG. 1) that is, with second elevator bar 40 adjacent the distributor bar and with the right end of slot 46 (FIGS. 1 and 3) situated almost abutting stud 43 (FIG. 4). As roller 14 rides over the low portion of cam 10, elevator head 57 initially moves horizontally to the right (FIG. 1) until pads 59 clear their respective distributor channels and spring 47 biases the left end of slot 46 against stud 43 whereupon head 57 commences an arcing descent. Throughout the descent of the second elevator, bar 40 is maintained in a vertical position due to the interaction of lever 24 and rod 25 pivoting about their stationary centers, shaft 23 and stud 43, respectively. When the elevator approaches the intermediate channel, slide 60 engages post 61 of the intermediate channel 12 so that the elevator bar descends vertically into the intermediate channel. At this time rod 25 yields against the force of spring 47 so that the rightward end of slot 46 (FIG. 4) once again approaches stud 43.

Once the matrices have been transferred to bar 40, roller 14 will engage the high portion of cam 10 and the elevator will begin to ascend. The initial movement of head 57 is vertical until slide 60 frees itself of post 61 whereupon it becomes arcuate and once again the interaction of lever 24 and rod 25 pivoting about their stationary pivots insures vertical alignment of the bar 40 and matrices suspended therefrom. Thus the violent swinging encountered with the prior art devices has been substantially reduced.

When the pads 59 engage their respective distributor channels further movement of bar 40 takes place in a horizontal direction and rod 25 yields in slot 46 against the action of spring 47 thereby providing accurate registry of the second elevator with the distributor mechanism. It will be noted that bracket 43A is slotted to permit rod 25 to accommodate itself as the elevator head engages the intermediate transfer channel or the distributor mechanism. Should slot 46 be eliminated, rod 25 would have a tendency to bend as opposed to yielding and would eventually rupture during machine operation. In this manner the present invention permits flexible alignment of the second elevator with the intermediate transfer channel and the distributor mechanism while maintaining the elevator head in a rigid fixed position as it carries matrices from the intermediate channel to the distributor mechanism.

The usual safety device is provided with the present elevator to prevent the descent of the elevator unless it starts its descent at the proper time in the machine cycle. Thus a projection 65 formed on hub 34A is in line with an abutment lever 66 fulcrumed on shaft 67 of frame 18. The roller 68 mounted on the lower end of lever 66 is engaged by a small extension cam 64 on the periphery of the line delivery cam 69 thereby pivoting lever 66 out of the path of projection 65 against the pull of spring 70 as lever 24 descends. The small extension cam acts upon roller 68 just before the second elevator starts down and lever 66 is held out of the path of projection 65 just long enough to allow that projection to pass if the elevator starts down on time. If the second elevator is at all delayed, it is held up by lever 66 until the operator remedies whatever may have caused the delay in the descent thereof.

In the accompanying drawings, the invention has been shown merely by way of example and in preferred form, but obviously many variations and modifications may be made therein and in its mode of operation which will still be comprised within its spirit. It is to be understood therefore that the invention is not limited to any specific form or embodiment, except insofar as such limitations are specified in the appended claims.

What is claimed is:

1. In a typographical casting machine having an intermediate transfer channel and a distributor mechanism, a second elevator for transporting matrices therebetween comprising an elevator lever pivotally mounted on the machine frame and operable to arcuately transport the matrices between said transfer channel and said distributor mechanism, a yoke member pivotally mounted on said elevator lever, a bar for supporting the matrices during elevation thereof pivotally fastened to said yoke, and a rod-like member pivotally and slidably mounted at one end on the machine frame and pivotally fastened to said bar at its other end, said member operating to maintain constant vertical alignment of the matrices during arcuate movement thereof.

2. In a typographical casting machine having an intermediate transfer channel and a distributor mechanism, a second elevator for transporting matrices therebetween comprising an elevator lever pivotally mounted on the machine frame and operable to arcuately transport the matrices between said transfer channel and said distributor mechanism, a yoke member pivotally mounted on said elevator lever, a bar for supporting the matrices during elevation thereof pivotally fastened to said yoke, and a rod-like member pivotally and slidably mounted on an adjustable pivot on the machine frame said pivot comprising a stud mounted on an adjustably positionable member attached to the machine frame whereby the vertical alignment of said bar can be adjusted relative to said elevator lever and said rod-like member to insure vertically aligned movement of the matrices.

3. In a typographical casting machine having an intermediate transfer channel and a distributor mechanism, a second elevator for transporting matrices therebetween comprising an elevator lever pivotally mounted on the machine frame and operable to arcuately transport the matrices between said transfer channel and said distributor mechanism, a yoke member pivotally mounted on said elevator lever, a bar for supporting the matrices during elevation thereof pivotally fastened to said yoke, and a rod-like member pivotally and slidably mounted at one end on the machine frame and pivotally fastened to said bar at its other end wherein said slidably mounted rod-like member comprises means for adjusting the effective length of said rod-like member by increasing or decreasing the permissible sliding movement thereof whereby accurate vertical alignment of the matrices during movement is achieved.

4. In a typographical casting machine having an intermediate transfer channel and a distributor mechanism, a second elevator for transporting matrices therebetween comprising an elevator lever pivotally mounted on the machine frame and operable to arcuately transport the matrices between said transfer channel and said distributor mechanism, a yoke member pivotally mounted on said elevator lever, a bar for supporting the matrices during elevation thereof pivotally fastened to said yoke, and a rod-like member pivotally and slidably mounted at one end on a stationary pivot and pivotally fastened to said elevator bar at its other end to maintain constant vertical alignment of said bar and matrices during transportation thereof, spring means biasing said one end of said rod-like member toward said stationary pivot to insure said vertical alignment during arcuate transportation of said bar, and to permit yieldable registration for the horizontal and vertical movement of said bar into said distributor and said channel respectively.

5. In a typographical casting machine having an intermediate transfer channel and a distributor mechanism, a second elevator for transporting matrices therebetween comprising an elevator lever pivotally mounted on the machine frame and operable to arcuately transport the matrices between said transfer channel and said distributor mechanism, a yoke member pivotally mounted on said elevator lever, a bar for supporting the matrices during elevation thereof pivotally fastened to said yoke, and a rod-like member pivotally and slidably mounted at one end on the machine frame and pivotally fastened to said bar at its other end, said yoke member being constantly biased against a stop on said elevator lever to insure continuous vertical alignment of the matrices during arcuate transportation of said bar and to permit yieldable registration for horizontal and vertical movement of said bar into said distributor and said channel respectively.

6. In a typographical casting machine having an intermediate transfer channel and a distributor mechanism, a second elevator comprising an elevator lever pivotally mounted on the machine frame and operable to arcuately transport the matrices between said transfer channel and said distributor mechanism, a yoke member pivotally mounted on said elevator lever, a bar for supporting the matrices during elevation thereof pivotally fastened to said yoke, a pivot mounted on the machine frame, a rod-like member pivotally and slidably mounted at one end on said pivot and pivotally fastened to said bar at its other end, an adjustable stop carried by said elevator lever at its remote end, means biasing said yoke member towards engagement with said stop, and means biasing said rod-like member towards a fixed position with respect to said pivot both biasing means yielding as said bar moves horizontally into registration with the distributor and vertically into registration with the transfer channel.

References Cited in the file of this patent

UNITED STATES PATENTS

| 1,625,085 | Leach | Apr. 19, 1927 |
| 1,689,991 | Berry | Oct. 30, 1928 |
| 2,134,668 | Murray | Oct. 25, 1938 |